Feb. 17, 1942. G. VAN ZALE 2,273,340
TIRE REMOVING TOOL
Filed April 5, 1941
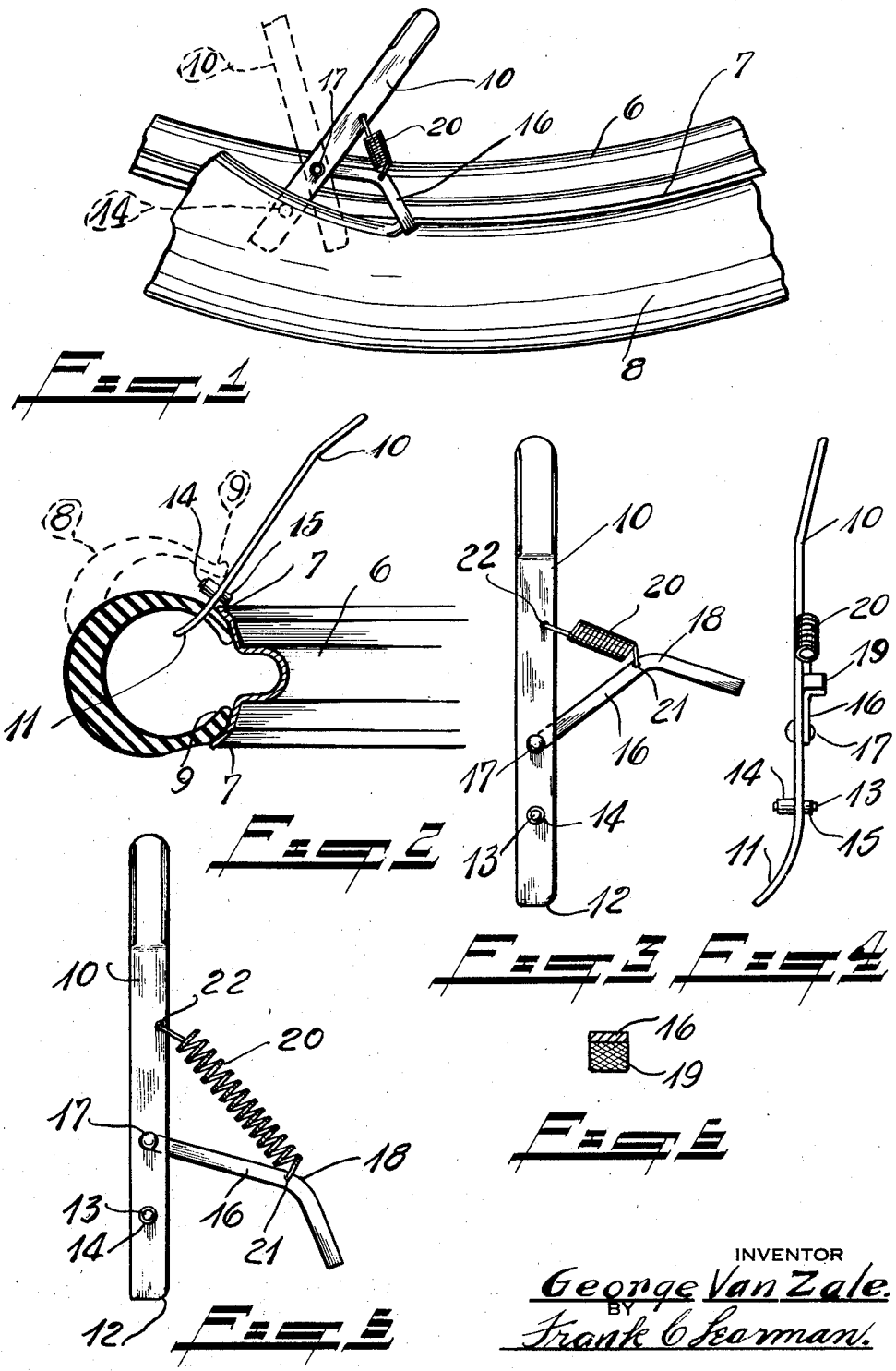
INVENTOR
George Van Zale.
BY
Frank C Seaman.

Patented Feb. 17, 1942

2,273,340

UNITED STATES PATENT OFFICE 2,273,340

TIRE REMOVING TOOL

George Van Zale, Bay City, Mich.

Application April 5, 1941, Serial No. 386,975

1 Claim. (Cl. 157—6)

This invention relates to means employed in removing tires from the wheels or rims of motor vehicles, cycles, and the like, and more particularly from drop center rims.

Considerable difficulty is experienced by mechanics and drivers of motor cars in removing tires from drop center rims as is often necessary in the event of punctures or blow-outs, owing to the fact that the tires must necessarily be a tight fit when in position on the rim and, therefore, must be sprung over the edge of the rim when the tire is being removed. The tool ofttimes slips, allowing the tire to slip back, and the tool also often damages the tire or the tube enclosed within the tire.

The prime object of the invention, therefore, is to design a tool which can be readily inserted in position, which does not slip and mar the rim or gouge the tire or tube, which has rolling contact with the tire bead, and by means of which the tire can be easily and quickly removed.

Another object of the invention is to design a tool which can be used to remove a tire from the rim of the wheel without removing the wheel from the vehicle.

A further object is to provide a very simple, sturdy, well-balanced tool, which is relatively light in weight, easy to manipulate, and which is very economical to manufacture and assemble.

With the above and other objects in view, the present invention consists in the combination and arrangement of parts, hereinafter more fully described, illustrated in the accompanying drawing, and more particularly pointed out in the appended claim, it being understood that changes may be made in the form, size, proportion, and minor details of construction, without departing from the spirit, or sacrificing any of the advantages of the invention.

In the drawing:

Fig. 1 is a fragmentary plan view of a drop center rim and a tire with my tire removing tool associated therewith, the broken lines showing the wedge bar swung back preparatory to advancing the lever and illustrating the oscillating movement of the handle for advancing the tool around the circumference of the rim;

Fig. 2 is a transverse sectional view showing the tool in position, the link and spring being omitted, the broken lines illustrating the tire bead in engagement with the anti-friction roller;

Fig. 3 is an enlarged detail front view of the tool;

Fig. 4 is an edge view thereof;

Fig. 5 is a view similar to Fig. 3, showing the lever swung down; and

Fig. 6 is an enlarged transverse sectional view through the lever and showing the knurled gripping face of the lever hook.

In the accompanying drawing in which I have shown the preferred embodiment of my invention, the numeral 6 indicates a drop center rim of conventional design, and which is formed with beaded edges 7, these rims being adapted to accommodate pneumatic tires 8 in the usual manner.

Drop center rims are formed in one continuous piece, that is, they are not split, and the pneumatic tires 8 are formed with beaded edges 9 which must be stretched over the beaded edge of the rim when mounting; consequently, they must again be stretched when removing. Further, due to the fact that the rim is circular, the tire has a tendency to slip back when pried over at but one point; consequently, an additional tool or bar must be utilized to hold this removed section until approximately one-half the circumference of one beaded edge is free.

My improved tire tool obviates the necessity of additional tools or bars and comprises a preferably flat lever or wedge bar 10, the lower end section of which is slightly curved as at 11, the end being rounded as at 12 so that there are no sharp corners or edges which might injure the tire 8 or the inner tube contained therein.

A pin 13 is mounted on this bar at a point spaced from the lower end thereof, and an antifriction roller 14 is journaled thereon, and is adapted to engage the beaded edge 9 of the tire as the tire is being removed, a stop 15 being provided on the opposite side of the bar and engages the beaded edge 7 of the rim to definitely space and limit the inward movement of the bar when the tool is inserted and operated.

A link 16 is pivotally connected to the wedge bar 10 by means of the rivet 17, said link being bent as at 18, the end being turned to form a hook 19, the face of which is knurled as shown in Fig. 6 for engaging the edge 7 of the rim 6, a spring 20 being connected to the link at the point 21, and to the wedge bar 10 at the point 22, said spring tending to pull the link upwardly and to hold the hook in engagement with the rim at all times.

As previously stated, the tool can be used in removing tires from rims either while on the vehicle, or when the wheel has been removed; it requires no skill to operate and when not in use, can be compactly folded so that it can be carried in the tool kit of the vehicle.

In practice, and when desiring to remove a tire from a wheel, the end 11 of the wedge bar is inserted between the rim and the tire, the tire is then pried up at this point so that the beaded edge 9 can be placed over the anti-friction roller 14 with the stop 15 in engagement with the rim; the hook end 19 of the link 16 is then placed in engagement with the edge of the rim, and then the end of the wedge bar is swung in a clockwise direction, pulling the inner end of the bar towards the free end of the link and forcing the beveled edge of the tire free from the rim, said edge rolling over the anti-friction roller 14 and eliminating friction; then when the lever is swung in the opposite direction, the hook end of the lever is advanced, and this operation is repeated until the tire is free.

There is no injury to the inner tube, tire or rim; the contact with the tire serves to hold the wedge bar in position when the handle end is swung, and the tension of the spring 20 serves to hold the lever in engagement with the rim. The tire is removed in a minimum length of time, and without marring the wheel or in any manner injuring the tire or inner tube.

From the foregoing description, it will be obvious that I have perfected a very simple, practical, and convenient tool for removing the tires from drop center rims.

What I claim is:

A tire removing tool of the class described and comprising a flat wedge bar formed with a slightly curved lower end section adapted to be inserted between a vehicle tire and a rim, an anti-friction means mounted on the face of the bar, and at a point spaced from the lower end of the bar, a rim engaging stop on the opposite face of the wedge bar directly opposite the anti-friction means, an angularly-shaped lever having its one end pivotally connected to the bar, a rim engaging hook on the free end thereof, and a spring anchored to said bar and to said lever at a point intermediate its length for exerting an upward pull on said lever.

GEORGE VAN ZALE.